United States Patent
Masuda et al.

(10) Patent No.: US 6,903,143 B2
(45) Date of Patent: Jun. 7, 2005

(54) PROCESS FOR PRODUCING THERMO-EXPANSIVE MICROCAPSULES

(75) Inventors: Toshiaki Masuda, Osaka (JP); Sachiko Tokumura, Osaka (JP)

(73) Assignee: Matsumoto Yushi-Seiyaku Co., Ltd., Osaka (JP)

( * ) Notice: Subject to any disclaimer, the term of this patent is extended or adjusted under 35 U.S.C. 154(b) by 300 days.

(21) Appl. No.: 10/111,937

(22) PCT Filed: Mar. 22, 2001

(86) PCT No.: PCT/JP01/02300

§ 371 (c)(1),
(2), (4) Date: Jul. 15, 2002

(87) PCT Pub. No.: WO01/72410

PCT Pub. Date: Oct. 4, 2001

(65) Prior Publication Data

US 2002/0180075 A1 Dec. 5, 2002

(30) Foreign Application Priority Data

Mar. 27, 2000 (JP) ........................................ 2000-132969

(51) Int. Cl.⁷ ................................................ C08L 9/00
(52) U.S. Cl. ........................ 521/84.1; 521/56; 521/59; 521/97; 521/139; 521/140; 523/201; 523/202; 523/205; 523/206; 523/210; 523/223; 524/834
(58) Field of Search .......................... 521/56, 59, 84.1, 521/97, 139, 140; 523/201, 202, 205, 206, 210, 223; 524/834

(56) References Cited

U.S. PATENT DOCUMENTS

| 3,615,972 A | 10/1971 | Morehouse et al. |
| 5,155,138 A | 10/1992 | Lundqvist |

FOREIGN PATENT DOCUMENTS

| JP | 42-26524 | 12/1967 |
| JP | 49-21610 | 6/1974 |
| JP | 56-143229 A | 11/1981 |
| JP | 62-286534 | 12/1987 |
| JP | 06-313130 A | 11/1994 |
| JP | 09-31371 A | 2/1997 |
| JP | 2894990 | 3/1999 |
| JP | 11-209504 | 8/1999 |
| JP | 2000-159823 A | 6/2000 |

*Primary Examiner*—Samuel A. Acquah
(74) *Attorney, Agent, or Firm*—Sherman & Shalloway

(57) ABSTRACT

A process for producing thermo-expansive microcapsules wherein a polymerizing mixture containing ethylenic unsaturated monomer and a blowing agent is suspend-polymerized to microencapsulate the blowing agent with the resultant polymer. The above-mentioned suspension-polymerization is performed with the presence of at least one compound selected from the group consisting of polypeptides and derivatives thereof as a suspension stabilizer. The process can control the particle size of microcapsules easily, attain stable reaction system and produce thermo-expansive microcapsules that disperse well in medium such as paint or inks.

5 Claims, No Drawings

PROCESS FOR PRODUCING THERMO-EXPANSIVE MICROCAPSULES

FIELD OF INVENTION

The present invention relates to a process for producing thermo-expansive microcapsules. More precisely, the present invention relates to a process for producing thermo-expansive microcapsules, wherein the particle size of the microcapsules is easily controlled, the polymerization reaction proceeds stably and thermo-expansive microcapsules dispersing smoothly into medium such as paint or inks are produced.

PRIOR ART

Various processes for producing thermo-expansive microcapsules wherein thermo-plastic polymer microencapsulates volatile blowing agents that gasify below the softening point of the said polymer to form thermo-expansive microcapsules have been studied. Japanese Patent Publication Sho 42-286534 discloses a general production process for thermo-expansive microcapsules. U.S. Pat. No. 3,615,972 describes a production process of thermo-expansive microcapsules of which polymer shell has uniform thickness. JP 2894990 describes a production process of heat-durable thermo-expansive microcapsules of which 80% or more is formed of acrylonitrile monomer.

Those known processes employ inorganic additives such as colloidal silica as a dispersion stabilizer, organic additives such as a diethanolamine-adipic acid condensate as a supplementary stabilizer, and polymerizing auxiliaries, if necessary, for suspension-polymerization to produce thermo-expansive microcapsules.

Further, Japanese Patent Publication Hei 11-209504 discloses a production process of blowing microspheres wherein a mixture containing a blowing agent and polymerizable monomer is suspend-polymerized with the existence of an alkali metal nitrite, stannous chloride, stannic chloride, water-soluble ascorbic acids or boric acid. The paragraph [0023] of the said Patent Publication discloses that the suspension-polymerization is performed in an aqueous dispersion containing a dispersion stabilizer (suspending agent). And gelatin is disclosed as one of the supplementary stabilizers for the dispersion stabilizer.

The above-mentioned production processes of thermo-expansive microcapsules require a technique for controlling particle size of microcapsules and the suspension-polymerization may sometimes be unstable depending on reaction condition. Furthermore, microcapsules produced in those processes have poor dispersing performance that causes difficulty in dispersing the microcapsules uniformly in a medium such as polymer, paint or ink. The cause of such poor dispersion behavior of microcapsules is insufficient dispersion of the dispersion stabilizers employed in those processes that leads to difficulty in particle size control and unstable polymerization systems. The poor dispersion of resultant microcapsules in various media is also caused from the poor dispersion of the dispersion stabilizers that led to adhesion of resultant microcapsules.

DISCLOSURE OF INVENTION

The object of the present invention is to provide a process for producing thermo-expansive microcapsules.

Another object of the present invention is to solve the above-mentioned problems and to provide a process for producing thermo-expansive microcapsules wherein the particle size of the microcapsules is easily controlled, the polymerization reaction proceeds stably and thermo-expansive microcapsules dispersing smoothly into medium such as paint or inks are produced.

Further objects and advantages of the present invention are evidently described below.

The above-mentioned objects and advantages of the present invention can be attained by a process for producing thermo-expansive microcapsules wherein the said microcapsules are produced in suspension-polymerization of a polymerizing mixture containing ethylenic unsaturated monomer and a blowing agent that is microencapsulated with the polymer produced in the polymerization, and the said process is characterized by the suspension-polymerization with the existence of a dispersion stabilizer, which is at least one compound selected from a group consisting of polypeptides and derivatives thereof.

PREFERRED EMBODIMENT OF INVENTION

The present invention has an advantage being different from that of conventional processes owing to the above-mentioned specific dispersion stabilizer. In the conventional processes, a complex formed of an organic additive and inorganic additive functions as a dispersion stabilizer. Such complex becomes unstable by heat and its dispersing and stabilizing behavior decreases with the advancement of polymerization to make the reaction system unstable. In the process of the present invention, the said polypeptide forms complex with an inorganic additive to attain dispersion similar to that in conventional processes. In addition, the said polypeptide also functions as surfactant and stabilizes the dispersion. Modifying the variants and molecular weight of the said polypeptide easily control the particle size distribution of resultant microcapsules.

The preferable dispersion stabilizers employed in the present invention are polypeptides produced by hydrolyzing collagen, and the derivatives of such polypeptides. The examples of such dispersion stabilizers are cationic collagen polypeptide, higher alkyl cationic collagen polypeptide, esterified collagen polypeptide and condensates of those polypeptide and fatty acids. Examples of the said condensates are coco fatty acid derivatives, lauric acid derivatives and undecylenic acid derivatives of polypeptides, and one or more of those are employed for polymerization. The average molecular weight of the said dispersion stabilizer is 12,000 or less, preferably 100 to 5,000, more preferably 300 to 3,000.

Known dispersion stabilizers applied with the above-mentioned dispersion stabilizers are silica, calcium phosphate, calcium carbonate, sodium chloride and sodium sulfate, and one or more of them are applied.

The ethylenic unsaturated monomers employed in the present invention are nitrile monomers, methacrylic acid esters, acrylic acid esters, acrylic acid, methacrylic acid, vinylidene chloride, vinyl chloride, styrene, vinyl acetate and butadiene, and one or more of those ethylenic unsaturated monomers can be employed. Preferable monomers are selected according to the softening point, durability against heat and chemicals, and end use of resultant polymer. For example, copolymers containing vinylidene chloride or nitrile monomer form superior gas barrier, and copolymers containing 80 weight percent or more of nitrile monomer have superior durability against heat and chemicals. Thus those monomers are selected for producing the polymer having those properties mentioned above.

Cross-linking agents can be applied to the polymerization of the present invention, if necessary. Examples of such cross-linking agents are divinyl benzene, ethylene glycol dimethacrylate, triethylene glycol dimethacrylate, triacryl formal, trimethylol propane tirmethacrylate, aryl methacrylate, 1,3-butyl glycol dimethacrylate and triaryl isocyanate, and one or more of those monomers can be applied.

The polymerization is performed with a polymerization initiator and the resultant polymer becomes the wall of microcapsules.

Known polymerization initiators such as peroxides and azo compounds, can be applied. Examples of such initiators are azobisisobutylnitrile, benzoyl peroxide, lauryl peroxide, diisopropyl peroxidicarbonate, t-butyl peroxide, and 2.2'-azobis(2,4-dimethyl valeronitrile). An oil-soluble initiator soluble in polymerizable monomers for the polymerization is preferable.

A preferable volatile blowing agent to be encapsulated into microcapsules is a substance that gasifies below the softening point of the wall of the resultant polymer. Examples of such volatile blowing agents are halogen compounds of propane, propylene, butene, normal butane, isobutane, isopentane, neopentane, normal pentane, hexane, heptane, petroleum ether and methane, liquids of low boiling point such as tetraalkylsilane, and compounds which thermally degrade into gas such as AIBN. Among those compounds, liquids of low boiling point, such as isobutane, normal butane, normal pentane and isopentane are preferable, and one or more of those liquids are applied.

The thermo-expansive microcapsules of the present invention can be produced through conventional suspension-polymerization wherein polymerizable monomer, a cross-linking agent, a volatile blowing agent and a polymerization initiator are mixed, and the mixture is suspend-polymerized in an aqueous medium, except an aqueous medium preferably containing polypeptide and/or a derivative thereof, a known inorganic additive and a polymerization initiator, if necessary, is used.

The polymerizing monomers, cross-linking agents, polymerization initiators, volatile blowing agents and other auxiliaries are not restricted within those mentioned above, and conventionally known monomers, agents and initiators can be applied for the purposes.

The aqueous medium for the suspension-polymerization is preferably prepared by adding above-mentioned dispersion stabilizer such as polypeptide in de-ionized water and by adding known dispersion stabilizers if necessary.

The process for producing thermo-expansive microcapsules of the present invention can control the particle size of resultant microcapsules easier than conventional processes, attain a stable reaction system having superior dispersion stability and produce thermo-expansive microcapsules that disperse into various media such as polymer, paint or inks better than those produced in conventional processes.

The present invention is explained more precisely with the following examples and comparative examples, though the present invention is not restricted within the scope of those examples.

COMPARATIVE EXAMPLE 1

An aqueous solution for suspension-polymerization was prepared by adding 1.5 g of an adipic acid-diethanolamine condensate and 60 g of 20-% colloidal silica solution to 600 g of ion-exchanged water, controlling the pH of the mixture to 3.0–3.2 with sulfuric acid, and agitating homogeneously.

An oily solution for suspension-polymerization was prepared by mixing 150 g of acrylonitrile, 150 g of methyl methacrylate, 1 g of trimethylol propane trimethacrylate, 35 g of petroleum ether and 10 g of isobutane and agitating to dissolve them.

The aqueous solution and oily solution were mixed and agitated with a homogenizer at 7,000 rpm for 2 minutes to be made into suspension. The suspension was transferred into a separable flask and the air was displaced with nitrogen gas. Then the suspension was polymerized at 60° C. with agitation.

After 4 hours of polymerization, the system became unstable with the increase of its temperature and finally the whole of the system coagulated.

COMPARATIVE EXAMPLE 2

An aqueous solution was prepared and polymerized as in Comparative Example 1 except 1.5 g of gelatin was added to the aqueous solution instead of 1.5 g of the adipic acid-diethanolamine condensate.

After 20 hours of polymerization, the resultant substance was cooled and filtered to be prepared into wet powder containing 60% of solid portion. After drying the wet powder, microcapsules adhered to each other and flocculated, and expected microcapsules were not produced.

EXAMPLE 1

An aqueous solution was prepared and polymerized as in Comparative Example 1 except 1.5 g of polypeptide, of which average molecular weight was 1,000, was added to the aqueous solution instead of 1.5 g of adipic acid-diethanolamine condensate.

After 20 hours of polymerization, the resultant substance was cooled and filtered to be prepared into wet powder containing 70% of solid portion. After drying the wet powder and smashing it, expected microcapsules were produced.

The particle size of the microcapsules was 20–30 µm.

The microcapsules were dispersed in EVA paste and coated on paper with a coater. The EVA paste containing the microcapsules spread smoothly and formed uniform coating film after expanding the microcapsules.

EXAMPLE 2

An aqueous solution was prepared and polymerized as in Comparative Example 1 except 1.5 g of a polypeptide-undecylenic acid condensate, of which average molecular weight was 1,000, was added to the aqueous solution instead of 1.5 g of adipic acid-diethanolamine condensate.

After 20 hours of polymerization, the resultant substance was cooled and filtered to be prepared into wet powder containing 70% of solid portion. After drying the wet powder and smashing it, expected microcapsules were produced.

The particle size of the microcapsules was 20–30 µm.

The microcapsules were dispersed in EVA paste and coated on paper with a coater. The EVA paste containing the microcapsules spread smoothly and formed uniform coating film after expanding the microcapsules.

COMPARATIVE EXAMPLE 3

An aqueous solution for suspension-polymerization was prepared by adding 2 g of an adipic acid-diethanolamine condensate, 60 g of 20-% colloidal silica solution and 100 g of common salt to 500 g of ion-exchanged water, controlling the pH of the mixture to 3.4–3.6 with sulfuric acid, and agitating homogeneously.

An oily solution for suspension-polymerization was prepared by mixing 150 g of acrylonitrile, 100 g of methacrylonitrile, 10 g of methyl methacrylate, 2 g of azobisisobutyronitrile and 50 g of isopentane and agitating to dissolve them.

The aqueous solution and oily solution were mixed and agitated with a homogenizer at 7,000 rpm for 2 minutes to be made into suspension. The suspension was then transferred into a separable flask. After the air was displaced with nitrogen gas, the suspension was polymerized at 70° C. with agitation for 20 hours.

After the polymerization, the resultant substance was cooled and filtered to be prepared into wet powder containing 70% of solid portion. After drying the wet powder and smashing it, expected microcapsules were produced.

The particle size of the microcapsules was variable from 10 to 40 $\mu$m.

The microcapsules were dispersed in EVA paste and coated on paper with a coater. The EVA paste containing the microcapsules spread unevenly into rough surface, which was estimated to have been caused from coagulated microcapsules due to poor dispersion, and did not form uniform coating film after expanding the microcapsules.

EXAMPLE 3

An aqueous solution was prepared and polymerized as in Comparative Example 3 except 2 g of a polypeptide, of which average molecular weight was 600, was added to the aqueous solution instead of 2 g of adipic acid-diethanolamine condensate, and the expected microcapsules were produced.

The particle size of the resultant microcapsules was 15–25 $\mu$m.

The microcapsules were dispersed in EVA paste and coated on paper with a coater. The EVA paste containing the microcapsules spread smoothly and formed uniform coating film after expanding the microcapsules.

EXAMPLE 4

An aqueous solution was prepared and polymerized as in Comparative Example 3 except 2 g of a polypeptide, of which average molecular weight was 1,000, was added to the aqueous solution instead of 2 g of adipic acid-diethanolamine condensate and the expected microcapsules were produced.

The particle size of the resultant microcapsules was 25–35 $\mu$m.

The microcapsules were dispersed in EVA paste and coated on paper with a coater. The EVA paste containing the microcapsules spread smoothly and formed uniform coating film after expanding the microcapsules.

What is claimed is:

1. A process for producing thermo-expansive microcapsules by suspend-polymerizing a polymerizable mixture containing ethylenic unsaturated monomer and a blowing agent to microencapsulate the blowing agent with the resultant polymer, wherein at least one substance selected from a group consisting of polypeptides and derivatives thereof having 12,000 or less of average molecular weight exists in the mixture as a suspension stabilizer.

2. The process in claim 1 wherein the said polypeptides are produced by hydrolyzing collagen.

3. The process in claim 1 wherein the average molecular weight of the said polypeptides ranges from 100 to 5,000.

4. The process in claim 1 wherein the said derivative of polypeptide is at least one selected from the group consisting of cationic polypeptides, higher alkyl cationic polypeptides, esterified polypeptides and fatty acid polypeptide condensates.

5. The process in claim 2 wherein the average molecular weight of the said polypeptides ranges from 100 to 5,000.

* * * * *